UNITED STATES PATENT OFFICE.

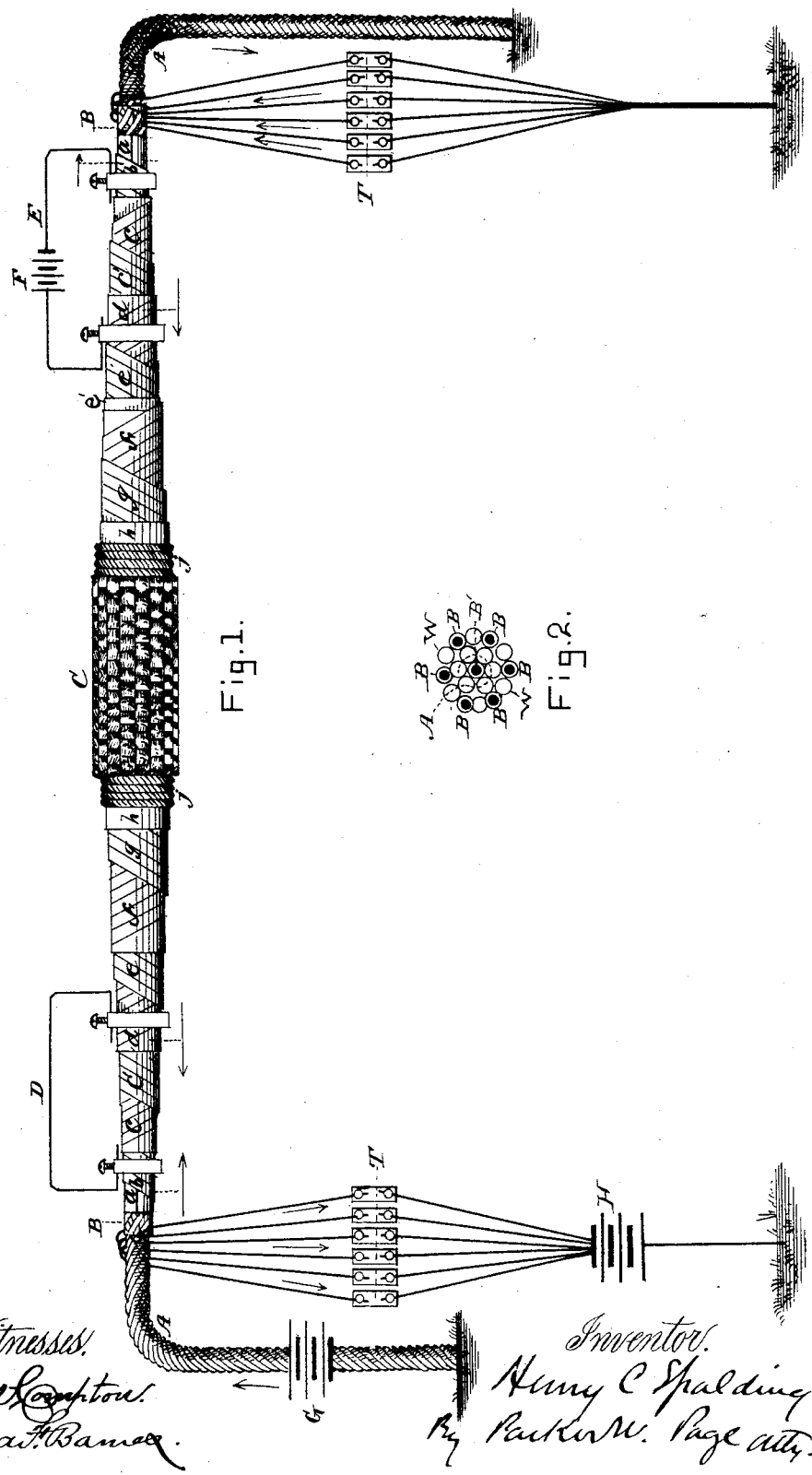

HENRY C. SPALDING, OF BOSTON, MASSACHUSETTS.

ANTI-INDUCTION CABLE.

SPECIFICATION forming part of Letters Patent No. 327,490, dated September 29, 1885.

Application filed April 27, 1885. (No model.)

*To all whom it may concern:*

Be it known that I, HENRY C. SPALDING, a citizen of the United States, residing at Boston, in the county of Suffolk and State of Massachusetts, have invented certain new and useful Improvements in Anti-Induction Cables, of which the following is a specification, reference being had to the drawings accompanying and forming a part of the same.

My invention is an improvement in telegraph-cables; and it has for its object to combine in a single cable a number of independent conductors, each serving as a line or circuit, and protected against induction and retardation. The means which I have devised for accomplishing this are as follows: I employ a central core of iron or steel wires, around which I wind spirally or helically the insulated wires for the several circuits. I also wind around the core naked steel or iron wires, one between each two adjacent insulated wires, the steel or iron wires being in direct metallic contact with the central core. I surround these wires with insulating and protective coats or layers, two of which are of metal, and at the ends of the cable these two metallic sheathings, which are insulated throughout their entire length, are electrically connected, and in the circuit so formed is inserted a battery or generator. The core is also grounded at its ends and connected with a battery, so that a continuous current passes through it. The current through the core passes or flows in a direction opposite to that in which the currents in the line-wires pass. The battery that produces the current for the metallic sheathings is so connected that the current in the inner sheathing, or that nearest to the insulated wires, passes in an opposite direction to those in the wires or in the same direction as the current in the core. I also use an insulated wire in the center of the core, which is used, like the others, for a line-wire.

I will describe the details of the invention by reference to the accompanying drawings, in which—

Figure 1 is a view of a section of cable with portions of each sheath or layer exposed, and showing the electrical connections. Fig. 2 is a cross-section of the wires used in the cable.

A is the core, composed of an arbitrary number of naked steel or iron wires and containing, when so desired, a central insulated copper wire, B'. Around this core are wound insulated copper wires B and naked steel or iron wires W, one of the latter being between each pair of the former.

If so desired, the steel or iron wires of core A and wires W may be twisted together first, and the insulated copper wires laid around the core subsequently between the wires W. The cable or group of wires is then covered with a two-part sheathing of plastic insulating material, $a$, similar to that elsewhere described by me in numerous applications. A spirally-wound layer of tin-foil, $b$, is then applied, and over this the following layers are formed in the order named: a spiral wrapping, $c$, of paper, an oppositely-wound layer, $c'$, of the same material, a second layer of tin-foil and a layer of paper, $e$, a non-corrosive layer or sheathing of metal tape or foil, $f$, a layer of paper, $g$, a coating of viscous insulating material, $h$, a serving of twine, $j$, and an outer braided jacket, C. Between the paper and metal layers are coats of varnish, indicated at $e'$.

So far as the mere construction of the cable is concerned great changes are possible. Many kinds of insulating and other materials may be used and applied in various ways.

The core A is grounded at each end of the cable, and in the circuit thus formed is inserted a galvanic battery, G. In the circuits formed by the wires B and B' are included suitable signaling-instruments, T T, and a battery or batteries, H. If the positive pole of the battery G is to ground, the positive pole of battery H is to line, or so that the currents in wires B and the core A shall be of opposite direction, as indicated by the arrows.

The two inner sheathings of metal, $b$ and $d$, are connected by wires D E and suitable clamps. In one of these wires, as E, is inserted a battery, F, that sends a current through the two sheathings in the direction indicated by the arrows—that is to say, the current in the inner sheath is opposite to those in wires B.

It will be observed that the currents through the core A and the sheathings $b$ $d$ are continuous, while those in the wires B are interrupted or varied in the transmission of signals.

With the above-described arrangement the currents in one insulated wire will not induce currents in the others, for the reason that a dead wire intervenes between each insulated wire and the others. The continuous currents from batteries F G prevent retardation in the working of the lines B, and the doubled circuit through the sheathings $b\ d$ cuts out electro-static influences.

The central wire, B', is exposed to the same influences as the others, except that its induced charge comes chiefly from the wires of the core A.

What I claim is—

1. In a telegraph-cable, the combination, with a central core composed of steel or iron wires, grounded at the ends and connected with a battery, of insulated conducting-wires and bare steel or iron wires alternately disposed and wound around the core, as set forth.

2. In a telegraph-cable, the combination, with a central core composed of bare wires of iron or steel twisted together, grounded at the ends, and connected with a battery, of insulated conducting-wires and bare steel or iron wires alternately-disposed and wound directly upon the core, as set forth.

3. In a telegraph-cable, the combination, with a grounded conducting-core, insulated conductors wound thereon, and an insulated metallic sheathing inclosing the wires, of batteries connected to the core and to the sheathing in such manner as to send continuous currents through the same in an opposite direction to the currents in the insulated wires, as set forth.

4. In a telegraph-cable, the combination, with a grounded core and insulated and bare wires laid thereon, the insulated wires alternating with the bare wires, and the latter being in metallic contact with the core, of a battery connected with the core in such manner as to send a continuous current through the same and the bare wires in contact therewith in an opposite direction to the currents in the insulated wires, as set forth.

5. In a telegraph-cable, the combination, with a grounded central conducting-core, insulated wires wound thereon, and a protective covering containing two insulated metallic sheathings, of a battery connected with the core for sending a current through the same in an opposite direction to the currents in the insulated wires, and a battery connected with the circuit formed by connecting the ends of the metallic sheathings, for sending a continuous current through the same, the current in the inner sheathing being in an opposite direction to that in the insulated wires, as set forth.

6. In a telegraph-cable, the combination, with a core composed of bare steel or iron wires twisted about a central insulated wire and insulated wires wound about said core, of ground-connections from the ends of a core and a battery connected therewith for sending a current through the core in an opposite direction to those in the insulated wires, as set forth.

HENRY C. SPALDING.

Witnesses:
 JOSEPH T. MCDEVITT,
 ALONZO B. WENTWORTH.